(12) United States Patent
Heath et al.

(10) Patent No.: US 7,954,833 B1
(45) Date of Patent: Jun. 7, 2011

(54) TRAILING BEAM ASSEMBLY

(75) Inventors: Jason Heath, Grand Rapids, MI (US); Bill Broene, Lowell, MI (US)

(73) Assignee: SAF-Holland, Inc., Holland, MI (US)

( * ) Notice: Subject to any disclaimer, the term of this patent is extended or adjusted under 35 U.S.C. 154(b) by 0 days.

(21) Appl. No.: 12/785,132

(22) Filed: May 21, 2010

(51) Int. Cl.
*B60G 9/00* (2006.01)

(52) U.S. Cl. ................................. 280/124.116

(58) Field of Classification Search ............ 280/124.11, 280/124.116, 124.128
See application file for complete search history.

(56) References Cited

U.S. PATENT DOCUMENTS

| | | | |
|---|---|---|---|
| 4,693,486 A | 9/1987 | Pierce et al. | |
| 5,203,585 A | 4/1993 | Pierce | |
| 6,241,266 B1 | 6/2001 | Smith et al. | |
| 6,557,875 B2 * | 5/2003 | Schlosser et al. | 280/124.153 |
| 7,007,960 B2 | 3/2006 | Chalin et al. | |
| 7,086,655 B2 * | 8/2006 | Chan et al. | 280/124.116 |
| 7,360,774 B2 * | 4/2008 | Saieg et al. | 280/124.128 |
| 2006/0237940 A1 | 10/2006 | Raidel, II et al. | |
| 2008/0029988 A1 * | 2/2008 | Saieg et al. | 280/124.116 |

* cited by examiner

*Primary Examiner* — Paul N Dickson
*Assistant Examiner* — Robert A Coker
(74) *Attorney, Agent, or Firm* — Price, Heneveld, Cooper, DeWitt & Litton, LLP

(57) ABSTRACT

A suspension assembly comprises an axle member extending between a pair of trailing beam assemblies, wherein each trailing beam assembly comprises first and second members pivotally coupled to one another that cooperate to form an aperture within which the axle member is clamped. Each trailing beam assembly comprises a first member having a first recess, and a second member that includes a second recess, wherein the first and second members are pivotally coupled to one another and are pivotable between a first position, wherein the first recess and second recess cooperate with one another to form an open aperture, and a second position, wherein the first recess and the second recess cooperate to form a first closed aperture that receives the axle member therethrough.

20 Claims, 6 Drawing Sheets

TRAILING BEAM ASSEMBLY

BACKGROUND OF THE INVENTION

The present invention relates to a suspension assembly for heavy duty vehicles, and specifically a suspension assembly that includes multiple piece trailing beam assemblies adapted to apply a clamping force to an associate axle.

SUMMARY OF THE INVENTION

One aspect of the present invention is to provide a suspension assembly that comprise an axle member, and a first trailing beam assembly that comprises a first member having a first recess and a second member that includes a second recess, wherein the first and second members are pivotally coupled to one another and are pivotable between a first position, wherein the first recess and the second recess cooperate with one another to form a first open aperture, and a second position, wherein the first recess and the second recess cooperate to form a first closed aperture that receives the axle member therethrough. The suspension assembly further comprises a second trailing beam assembly that comprises a third member having a third recess and a fourth member that includes a fourth recess, wherein the third and fourth members are pivotally coupled to one another and are pivotable between a first position, wherein the third recess and the fourth recess cooperate with one another to form a second open aperture, and a second position, wherein the third recess and the fourth recess cooperate to form a second closed aperture that receives the axle member therethrough.

Another aspect of the present invention is to provide a trailing beam assembly that comprises a first member having a first portion adapted to operably couple to a vehicle frame and having a second portion that includes a first recess, and a second member having a third portion adapted to operably couple to a spring assembly and a fourth portion that includes a second recess, wherein the first member and the third member are pivotally coupled to one another, the first and second members pivotable between a first position, wherein the first recess and the second recess cooperate with one another to form an open aperture, and a second position, wherein the first recess and the second recess cooperate to form a closed aperture adapted to receive an axle therethrough.

Yet another aspect of the present invention is to provide a suspension assembly that comprises an axle member having an outer geometry, and a first trailing beam assembly comprising a first member having a first portion adapted to operably couple to a vehicle frame, a second portion that includes a first recess, and first and second laterally-extending apertures, and a second member that includes a second recess and third and fourth laterally-extending apertures, wherein the first and second apertures are pivotally coupled to one another by a first mechanical fastener extending through the first apertures of the first and second members, the first and second members pivotally coupled between a first position, wherein the first recess and the second recess cooperate with one another to form a first open aperture, and a second position, wherein the first recess and the second recess cooperate to form a first closed aperture having a first inner geometry that receives the axle member therethrough, the first trailing beam assembly exerting a clamping force on the axle member within the first closed aperture, and wherein the first and second members are retained in the second position by a second mechanical fastener received through the second apertures of the first and second members. The suspension assembly further comprises a second trailing beam assembly that comprise a third member having a first portion adapted to operably couple to a vehicle frame, a second portion that includes a first recess, and first and second laterally-extending apertures, and a fourth member that includes a second recess and first and second laterally-extending apertures, wherein the third and fourth members are pivotally coupled to one another by a third mechanical fastener extending through the first apertures of the third and fourth members, the third and fourth members pivotable between a first position, wherein the first recess of the third member and the second recess of the fourth member cooperate with one another to form a second open aperture, and a second position, wherein the first recess and the second recess cooperate to form a second closed aperture having a first inner geometry and that receives the axle member therethrough, and wherein the second trailing beam assembly exerts a clamping force on the axle member within the second closed aperture, and wherein the third and fourth members are retained in the second position by a fourth mechanical fastener received through the second apertures of the third and fourth members.

Aspects of the present invention are to provide a trailing beam assembly that includes a hinge clamped design, thereby reducing or eliminating separate clamping and welding assemblies typically required to secure the trailing beams to an associated axle member. The present inventive trailing beam assembly may be secured to the associated axle member by plastically or elastically deforming the axle or elements of the trailing beam assembly member via the clamping force, by a variety of irregularities extending along an inner surface within the clamped area, or by other related means. Further, the clamping interaction between the present inventive trailing beam assemblies and the associated axle member serves to absorb manufacturing tolerances as well as change the frictional coefficient therebetween, as noted above. The present inventive trailing beam assembly is highly durable, reduces associated manufacturing costs, includes an uncomplicated design, and can be easily and quickly assembled even by relatively unskilled personnel. The trailing beam assembly of the present invention is also economical to manufacture, capable of a long operating life, and is particularly well adapted for the proposed use.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
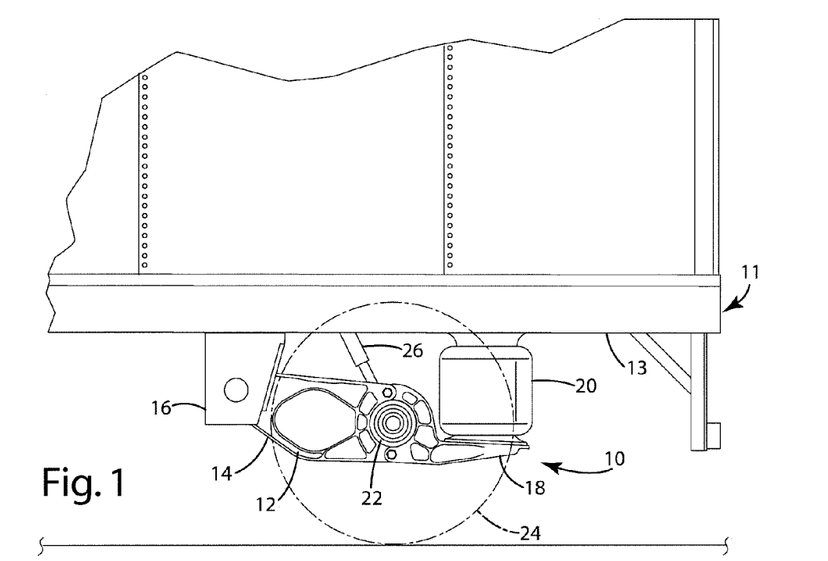
FIG. 1 is side elevational view of a suspension assembly that includes a trailing beam assembly of the present invention.
Figure 2:
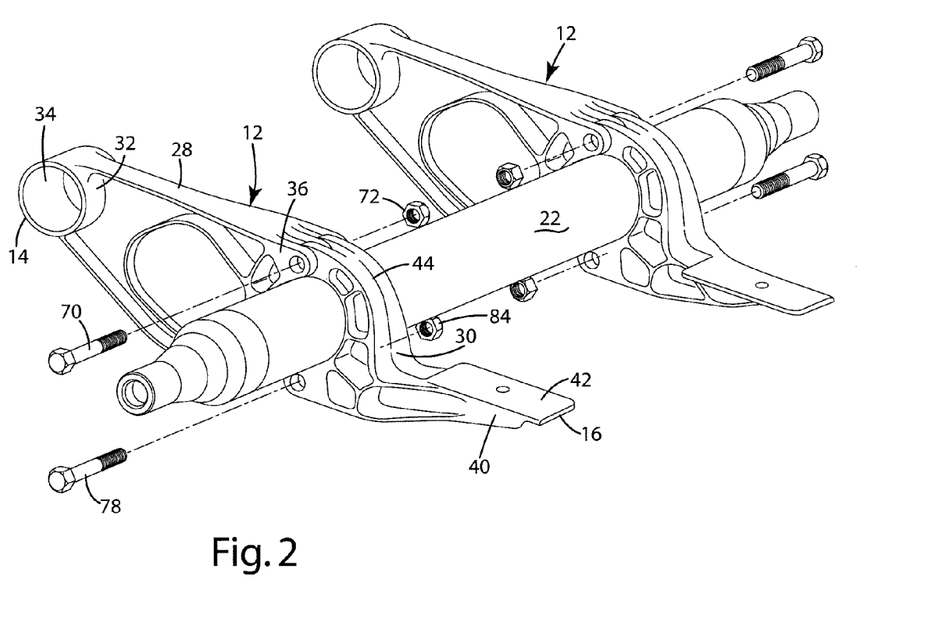
FIG. 2 is a perspective view of a pair of trailing beam assemblies and an axle member.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a trailing beam suspension embodying the present invention. In the illustrated example, the trailing beam suspension 10 is suspended from a trailer frame 11, including a trailer frame rail 13. The trailing beam suspension 10 comprises a pair of trailing beam assemblies 12 (FIG. 2), each having a first end pivotally coupled to an associated frame rail 13 via a trailing beam mounting bracket 16, and a second end 18 operably coupled to the associated frame rail 13 via an air spring assembly 20. The trailing beam suspension 10 further includes an axle member 22 extending between the trailing beam assemblies 12 and supporting a wheel assembly 24 at each end thereof, and a pair of shock absorbers 26 extending between respective trailing beam assemblies 12 and frame rails 13. It is appreciated that the present inventive trailing beam suspension 10 may be incorporated within a variety of tractor and trailer configurations, and utilized within various alternative components to those illustrated in the present example.

Figure 3:
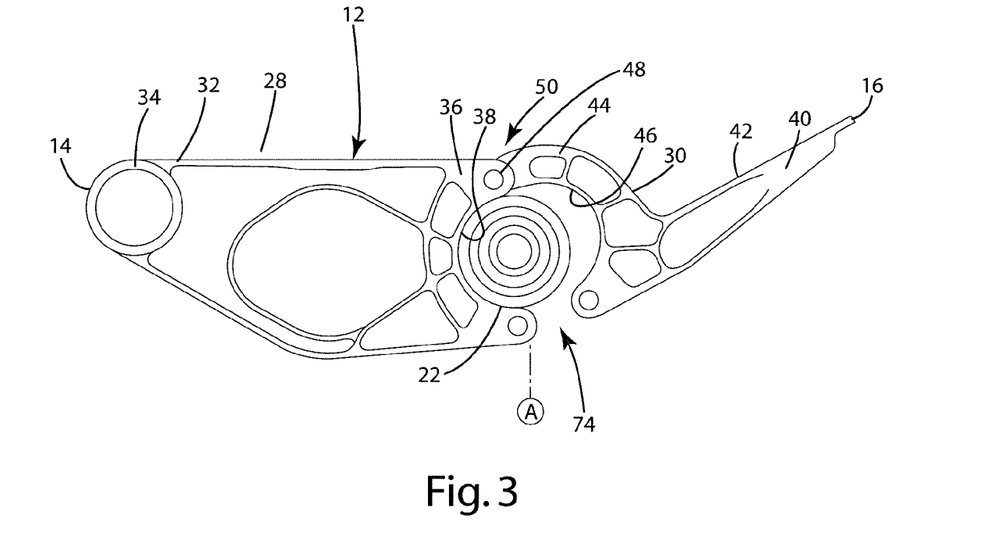
FIG. 3 is a side elevational view of the trailing beam assembly, wherein the trailing beam assembly is in an open position.
Figure 4:
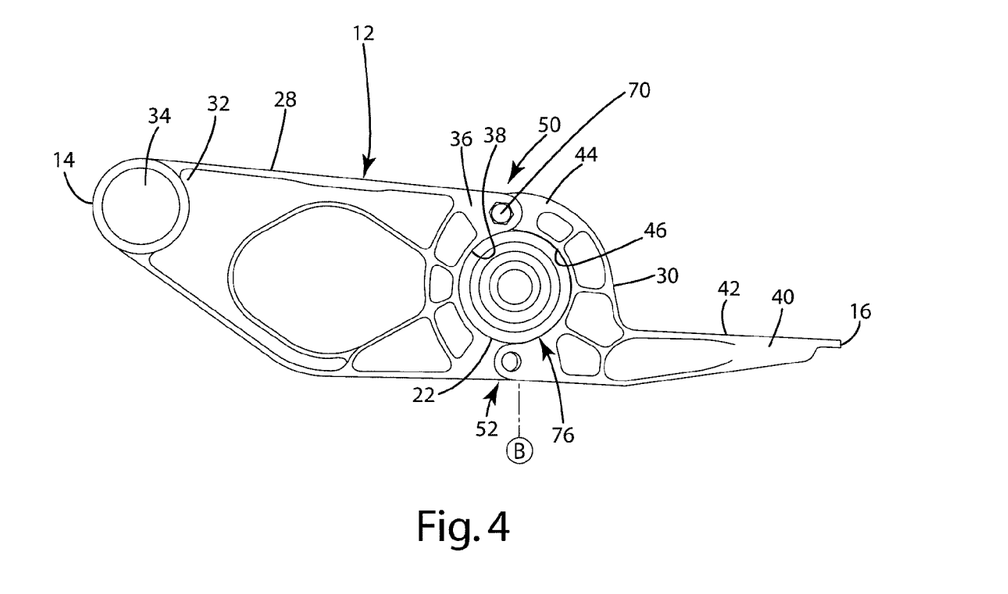
FIG. 4 is a side elevational view of the trailing beam assembly, wherein the trailing beam assembly is in a closed position.

As best illustrated in FIGS. 2-4, each trailing beam assembly 12 includes a first member 28 hingedly coupled to a second member 30, as described below. The first member 28 includes a forward portion 32 that includes a bushing aperture 34 that receives a bushing assembly (not shown) therein pivotally coupling the trailing beam assembly 12 to the associated trailing beam mounting bracket 16, and a rearward portion 36 having a rearwardly-opening recess 38. The second member 30 includes a rearward portion 40 that includes a spring seat 42, and a forward portion 44 that includes a forwardly-opening recess 46. It is noted that the present two-piece beam assembly 12 allows each piece to be selected for a partial application, for example, a standard-sized first member 28 may be utilized for certain applications, while the second member 30 may be selected from various configured components to provide various support heights for the supported air spring assembly 20.

Figures 5, 6:
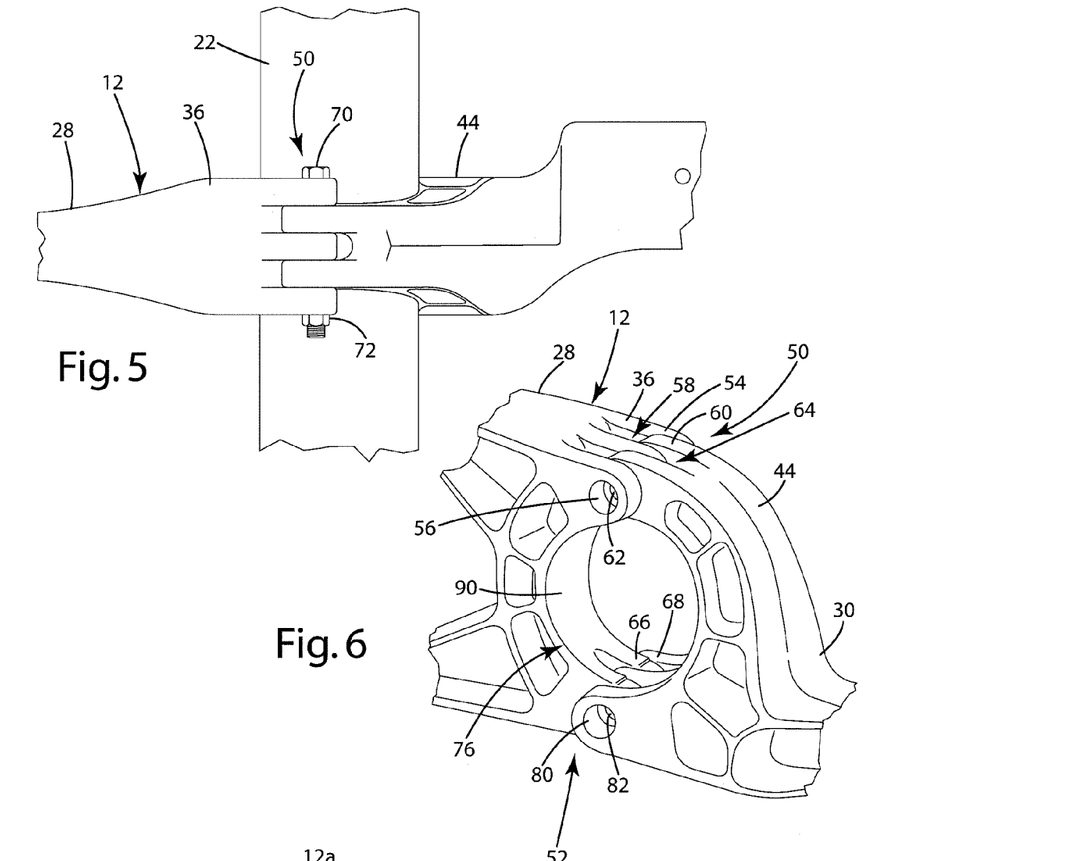
FIG. 5 is a top plan view of the trailing beam assembly positioned about the axle member.
FIG. 6 is an enlarged perspective view of a clamping area of the trailing beam assembly.

The first member 28 of each trailing beam assembly 12 is pivotally coupled to the associated second member 30, and is pivotable between an open position A (FIG. 3) and a closed position B (FIG. 4). As best illustrated in FIGS. 5 and 6, the rearward portion 36 of the first member 28 and the forward portion 44 of the second member 36 cooperate to form an upper hinge assembly 50 and a lower hinge assembly 52. In the illustrated example, the rearward portion 36 of the first member 28 includes three rearwardly-extending hinge fingers 54 each including an aperture 56 extending laterally therethrough, and spaced from one another so as to define gaps 58 therebetween. The forward portion 44 of the second member 30 includes a pair of hinge fingers 60 each including an aperture 62 extending laterally therethrough, and spaced from one another so as to form a gap 64 therebetween. The lower hinge assembly 52 is constructed in a similar manner, with the rearward portion 36 of the first member 28 including a pair of hinge fingers 66 and the forward portion 44 of the second member 30 including three hinge fingers 68.

In assembly, a mechanical fastener such as a bolt 70 is extended through the apertures 56 and 62 so as to pivotally secure the hinge fingers 54 of the first member 28 and the hinge fingers 60 of the second member 30 in a hinged manner. An associated nut 72 secures the bolt 70 within the apertures 56 and 62. Other fastener types may be utilized including, but not limited to, pins, rivets, huck fasteners, welding, adhesives, and the like. The recess 38 of the first member 28 and the recess 46 of the second member 30 cooperate to define an open aperture 74 when the first member 28 and the second member 30 are in the open position A. Subsequent to the axle 22 being placed within the open aperture 74, the first member 28 and the second member 30 are moved from the open position A to the closed position B, such that the recess 38 of the first member 28 and the recess 46 of the second member 30 cooperate to form a closed aperture 76. The first member 28 and the second member 30 of the trailing beam assembly 12 cooperate to exert a clamping force onto the axle member 22 when in the closed position B. The first member 28 and the second member 30 of the trailing beam assembly 12 are held and retained in the closed position B by a mechanical fastener such as a bolt 78 that is received within the apertures 80, 82 extending laterally through the hinge fingers 66, 68, and is held therein via an associated nut 84. The particular configuration of the illustrated example provides multiple shear areas across the bolts 70, 78, thereby reducing localized stress.

Alternatively, each of the trailing beam assemblies 12 may be assembled with the associated axle member 22 without a pivoting connection between the first and second portions of each trailing beam assembly by mechanically forcing each portion into alignment with one another, e.g., via a press operation.

Figure 7:
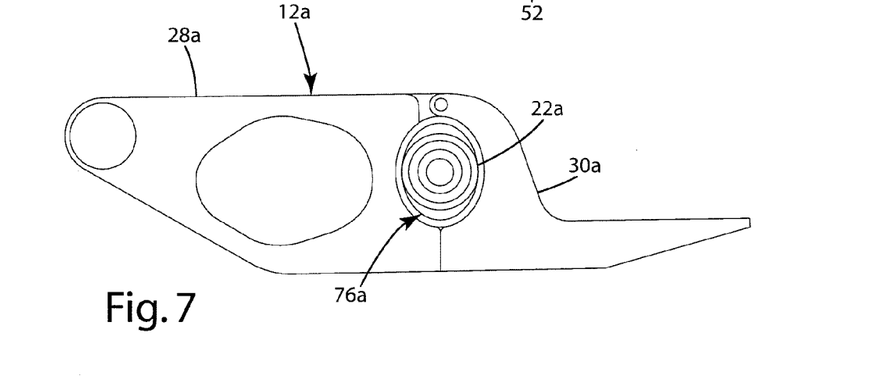
FIG. 7 is a side elevational view of a first alternative embodiment of the trailing beam assembly.

In the example illustrated in FIGS. 3 and 4, the axle member 22 is provided with an outer surface geometry that is substantially circular in shape, while the closed aperture 76 also is substantially circular in shape. It is noted that the inner diameter as defined by the closed aperture 76 may be slightly smaller than the outer diameter than the outer diameter of the axle member 22, thereby causing the outer surface of the axle member 22 to deform as the first member 28 and second member 30 are pivoted from the open position A to the closed position B. Alternatively, the outer geometry of the axle member 22 and the inner geometry of the closed aperture 76 may differ from one another. For example, as best illustrated in FIG. 7, the inner geometry of the closed aperture 76a may be oval-shaped, while the outer geometry of the axle member 22a may be substantially circular-shaped. It is noted that the deformation may be either elastic or plastic, and that such deformation may occur to elements of the trailing beam assemblies. The reference numeral 12a generally designates an alternative embodiment of the trailing beam assembly. Since the trailing beam assembly 12a is similar to the previously described trailing beam assembly 12, similar parts appearing in FIGS. 2-6 and FIG. 7, respectively are represented by the same, corresponding reference numeral, except for the suffix "a" in the numerals of the latter. The oval shape of the closed aperture 76a caused deformation of the outer surface of the axle member 22 as the first member 28a and the second member 30a are moved from the open position A to the closed position B. While circular and oval-shaped configurations are illustrated, it is appreciated that other geometrical configurations may be utilized for the axle and the closed aperture of the trailing beam assemblies may be utilized.

The deformation of the axle member 22 results in a greater surface contact to reduce fretting, and also results in a strengthening of the axle member 22 by hardening the material of the axle member 22, increasing the vertical section modulus, and minimizing alternative tensile stresses. Further, the permanent deformation of the axle member 22a, and potentially the trailing beam assembly 12a, results in a preloading of the components, forces material into microscopic and macroscopic surface irregularities, thereby resulting in a higher friction coefficient, and reduces axle slip. In the illustrated example, forces between the trailing beam assemblies 12 and the axle member 22 may reach 350,000 pounds of clamp load. The permanent deformation results in localized indentation of the axle member 22a thereby providing a "positive geometry" between the axle member 22a and the associated trailing beam assemblies 12a, and improved lateral loading resistance. Moreover, the permanent deformation of the axle member 22a and potentially the trailing beam assemblies 12a, may be utilized to compensate for manufacturing tolerances.

Figure 8A:
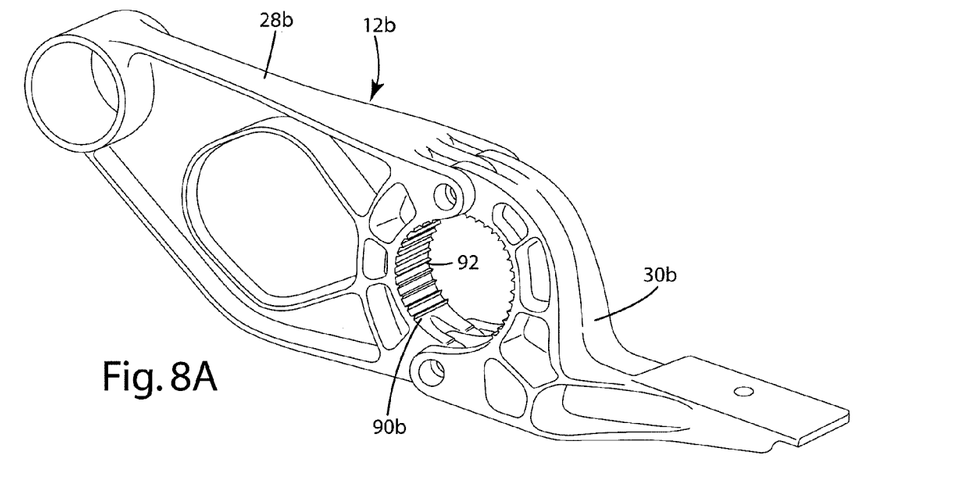
FIG. 8A is a perspective view of a second alternative embodiment of the trailing beam assembly.
Figure 8B:
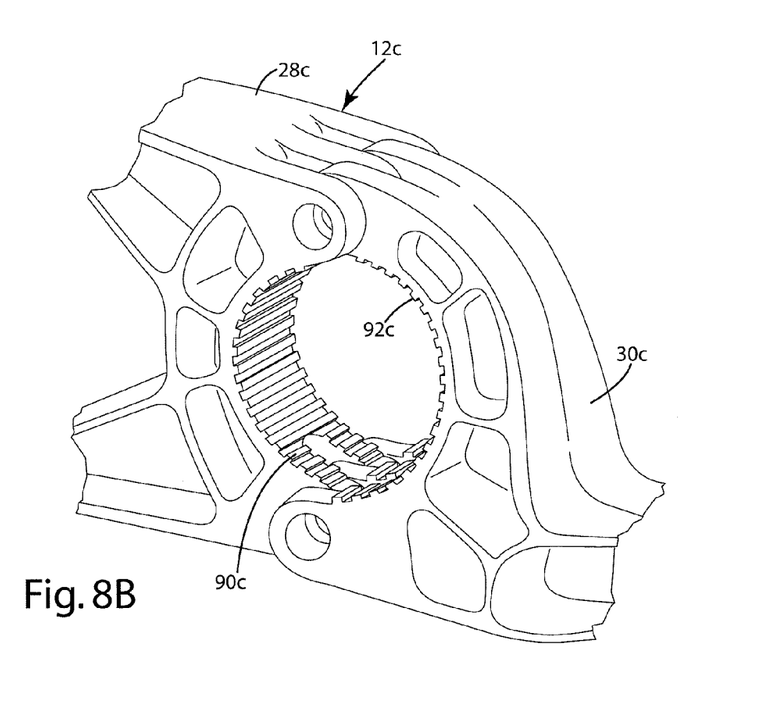
FIG. 8B is a perspective view of a third alternative embodiment of the trailing beam assembly.
Figure 8C:
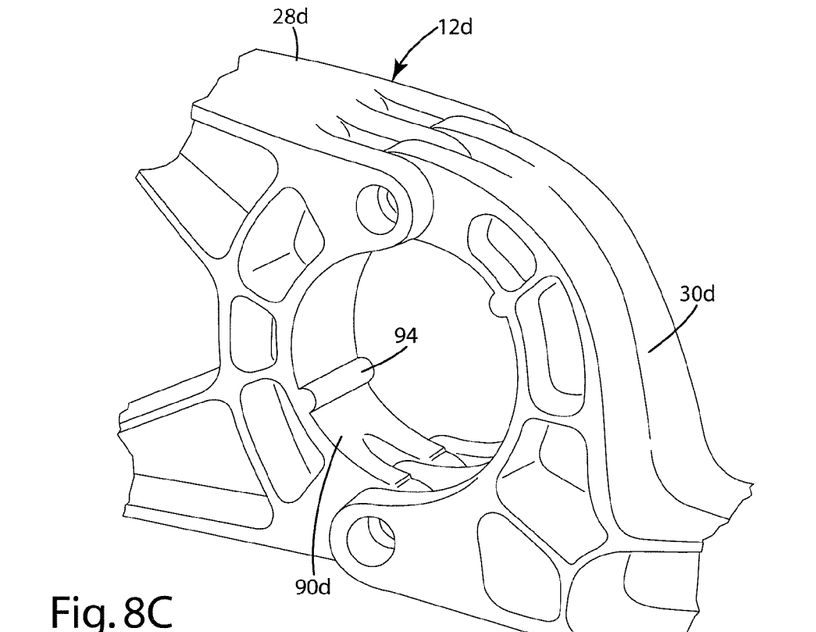
FIG. 8C is a perspective view of a fourth alternative embodiment of the trailing beam assembly.
Figure 8D:
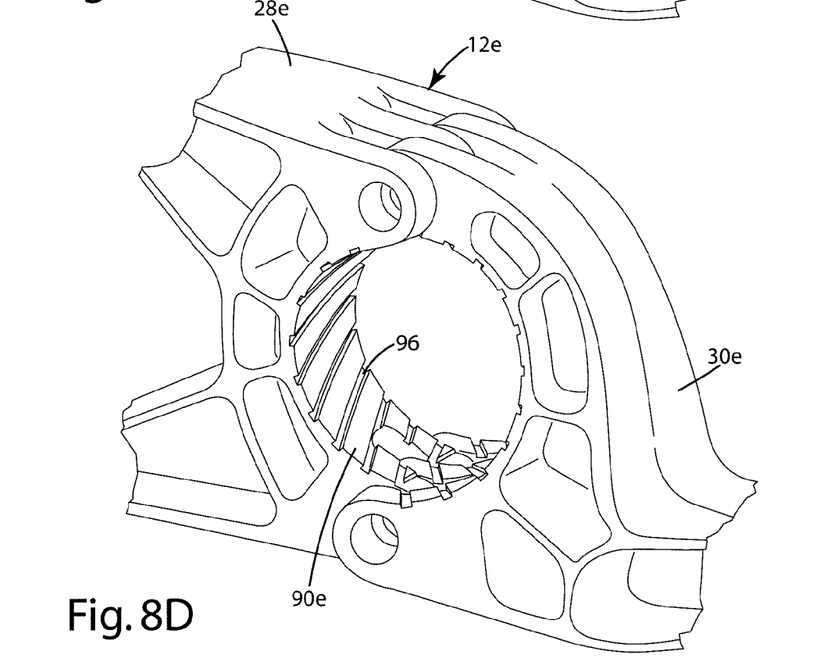
FIG. 8D is a perspective view of a fifth alternative embodiment of the trailing beam assembly.

The inner surface 90 (FIG. 6) and/or the surfaces of the axle member 22 which the inner surface 90 abuts may be cast, forged, rolled, machined, processed with special surface treatments, such as knurling, and/or coated with friction-enhancing substances such as zinc phosphates, adhesives, or acids to induce corrosion. In the particular example illustrated in FIG. 6, the inner surface 90 of the aperture 76 is provided with a plurality of irregularities extending inwardly or outwardly therefrom, so as to increase the frictional coefficient between the trailing beam assembly 12 and the axle member 22. As best illustrated in FIG. 8A, the trailing beam assembly 12b includes a plurality of triangularly-shaped teeth spaced circumferentially about the aperture 90b. In assembly, the teeth 92 serve to further deform and engage the outer surface of the associated axle member as the first member 28b and the second member 30b are moved from the open position A to the closed position B. Irregularities of other shapes and sizes may also be utilized, for example, a plurality of teeth 92c (FIG. 8B), a pair of outwardly-extending nubs 94, or a plurality of inwardly-extending rifle-like grooves 96 (FIG. 8D).

Figure 9A:
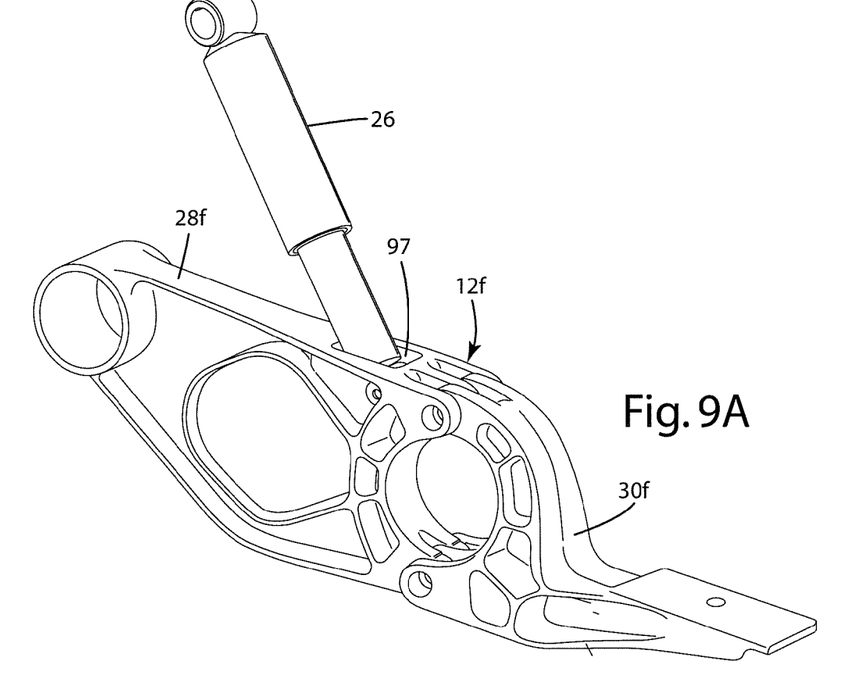
FIG. 9A is a perspective view of an alternative embodiment of the trailing beam with a shock absorber secured thereto.
Figure 9B:
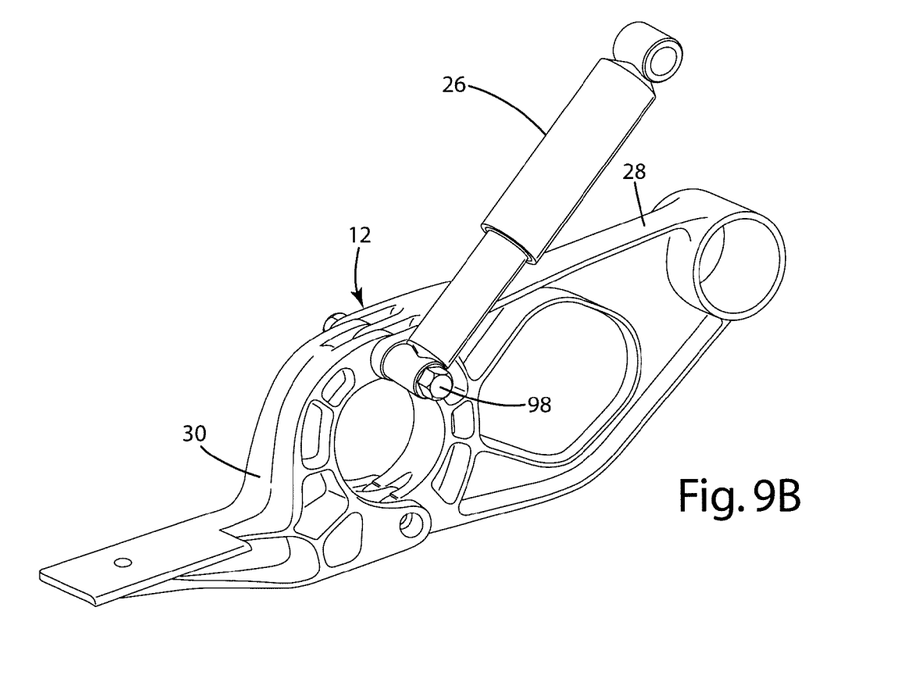
FIG. 9B is a perspective view of another alternative embodiment of the trailing beam with a shock absorber secured thereto

The trailing beam assembly 12f (FIG. 9A) may also be configured so as to provide integrally-molded means of attaching the associated shock absorber 26 thereto. For example, the first member 28f of the trailing beam assembly 12f may be provided with a recess 97 extending downwardly into an upper surface thereof and adapted to receive an end of the shock absorber 26 therein, wherein the shock absorber is fastened to the trailing beam assembly 12 via a mechanical fastener (not shown). Alternatively, the shock absorber 26 (FIG. 9B) may be secured to the trailing beam assembly 12 via a bolt 98. The bolt 98 is similar in style and function to the bolt 70 as previously described, however, the bolt 78 is extended so as to allow associated shock absorber 26 to be secured to an end thereof.

The trailing beam assembly as disclosed herein includes a hinge clamped design, thereby reducing or eliminating external clamping and welding assemblies typically required to secure the trailing beams to an associated axle member. The present inventive trailing beam assembly may be secured to the associated axle member by elastically or plastically deforming the axle member and/or elements of the trailing beam assemblies via the clamping force, by a variety of irregularities extending along an inner surface within the clamped area, or by other related means. Further, the clamping interaction between the present inventive trailing beam assemblies and the associated axle member serves to absorb manufacturing tolerances as well as change the frictional coefficient therebetween, as noted above. The present inventive trailing beam assembly is highly durable, reduces associated manufacturing costs, includes an uncomplicated design, and can be easily and quickly assembled even by relatively unskilled personnel. The trailing beam assembly of the present invention is also economical to manufacture, capable of a long operating life, and is particularly well adapted for the proposed use.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A suspension assembly, comprising:
   an axle member;
   a first trailing beam assembly, comprising:
      a first member having a first recess; and
      a second member that includes a second recess, wherein the first and second members are pivotally coupled to one another and are pivotable between a first position, wherein the first recess and second recess cooperate with one another to form a first open aperture, and a second position, wherein the first recess and the second recess cooperate to form a first closed aperture that receives the axle member therethrough; and
   a second trailing beam assembly, comprising:
      a third member having a third recess; and
      a fourth member that includes a fourth recess, wherein the third and fourth members are pivotally coupled to one another, and are pivotable between a first position, wherein the third recess and fourth recess cooperate with one another to form a second open aperture, and a second position, wherein the third recess and the fourth recess cooperate to form a second closed aperture that receives the axle member therethrough.

2. The suspension assembly of claim 1, wherein the axle member includes an outer geometry, the first closed aperture includes a first inner geometry, and the second closed aperture includes a second inner geometry, wherein the first outer geometry is different from the first and second inner geometries.

3. The suspension assembly of claim 1, wherein the first trailing beam assembly and the second trailing beam assembly each exert a clamping force on the axle member within the first closed aperture and the second closed aperture, respectively.

4. The suspension assembly of claim 3, wherein at least a select one of the axle member, the first trailing beam assembly and the second trailing beam assembly is deformed when the first and second members of the first trailing beam assembly are pivoted from the first position to the second position thereof.

5. The suspension assembly of claim 4, wherein the outer geometry is substantially circular prior to assembly with the first trailing beam assembly, and wherein the axle member is deformed to a substantially out of round geometry when the first and second members of the first trailing beam assembly are pivoted from the first to the second positions.

6. The suspension assembly of claim 4, wherein the select one of the axle member, the first trailing beam assembly and the second trailing beam assembly is worked hardened in the area of deformation.

7. The suspension assembly of claim 1, wherein the first closed aperture defines an inner surface having at least one irregularity extending therealong, and wherein the at least one irregularity abuts an outer surface of the axle member when the first and second members of the first trailing beam assembly are in the second position.

8. The suspension assembly of claim 7, wherein the at least one irregularity extends outwardly from the inner surface.

9. The suspension assembly of claim 8, wherein the at least one irregularity has a triangularly-shaped cross-sectional configuration.

10. The suspension assembly of claim 1, wherein the first member includes at least one laterally extending first aperture, and wherein the second member includes at least one laterally extending first aperture, and further including:
a first mechanical fastener extending through the at least one first aperture of the first and second members to pivotally couple the first member to the second member.

11. The suspension assembly of claim 10, wherein the first member includes at least one laterally extending second aperture vertically offset from the at least one first aperture of the first member, and wherein the second member includes at least one laterally extending second aperture, and further including:
a second mechanical faster extending through the at least one second aperture of the first and second members retaining the first and second members in the second position.

12. The suspension assembly of claim 1, wherein the axle member includes an outer surface that is treated with at least a select one of an adhesive, zinc, phosphate and an acid in an area of contact between the axle member and the trailing beam assemblies.

13. A trailing beam assembly, comprising:
a first member having a first portion adapted to operably couple to a vehicle frame and having a second portion that includes a first recess; and
a second member having a third portion adapted to operably couple to a spring assembly and a fourth portion that includes a second recess, wherein the first member and the second member are pivotally coupled to one another, the first and second members pivotable between a first position, wherein the first recess and second recess cooperate with one another to form an open aperture, and a second position, wherein the first recess and the second recess cooperate to form a closed aperture adapted to receive an axle member therethrough.

14. The trailing beam assembly of claim 13, wherein the trailing beam assembly is adapted to exert a clamping force on an axle member when the first and second members are in the second position.

15. The trailing beam assembly of claim 14, wherein the trailing beam assembly is adapted to deform an outer geometry of an axle as the first member and second member are moved from the first position to the second position.

16. The trailing beam assembly of claim 13, wherein the closed aperture defines an inner surface having at least one irregularity extending therealong, and wherein the at least one irregularity is adapted to abut an outer surface of an axle member when the first and second members are in the second position.

17. The trailing beam assembly of claim 16, wherein the at least one irregularity extends outwardly from the inner surface.

18. The trailing beam assembly of claim 17, wherein the at least one irregularity has a triangularly-shaped cross-sectional configuration.

19. The trailing beam assembly of claim 13, wherein the first member includes at least one laterally extending first aperture, and wherein the second member includes at least one laterally extending second aperture, and further including:
a first mechanical fastener extending through the at least one first aperture of the first member and at least one second aperture of the second member to pivotally couple the first member to the second member.

20. The trailing beam assembly of claim 19, wherein the first member includes at least one laterally extending third aperture circumferentially offset about the closed aperture from the at least one first aperture of the first member, and wherein the second member includes at least one laterally extending fourth aperture, and further including:
a second mechanical faster extending through the at least one third aperture of the first member and the at least one fourth aperture of the second member retaining the first and second members in the second position.

* * * * *